(12) United States Patent
Thurow

(10) Patent No.: US 9,108,549 B2
(45) Date of Patent: Aug. 18, 2015

(54) SELF-ADJUSTABLE ARM REST ASSEMBLY

(71) Applicant: FLEXSTEEL INDUSTRIES, INC., Dubuque, IA (US)

(72) Inventor: Jerry Thurow, Dubuque, IA (US)

(73) Assignee: FLEXSTEEL INDUSTRIES, INC., Dubuque, IA (US)

( * ) Notice: Subject to any disclaimer, the term of this patent is extended or adjusted under 35 U.S.C. 154(b) by 68 days.

(21) Appl. No.: 13/765,999

(22) Filed: Feb. 13, 2013

(65) Prior Publication Data

US 2014/0225410 A1    Aug. 14, 2014

(51) Int. Cl.
*B60N 2/46*    (2006.01)
*B60N 2/22*    (2006.01)
*B60N 2/44*    (2006.01)

(52) U.S. Cl.
CPC ............... *B60N 2/4633* (2013.01); *B60N 2/22* (2013.01); *B60N 2002/445* (2013.01)

(58) Field of Classification Search
CPC .................................................... B60N 2/4633
USPC ........................................ 297/411.38, 411.39
See application file for complete search history.

(56) References Cited

U.S. PATENT DOCUMENTS

| | | | | |
|---|---|---|---|---|
| 5,395,160 | A * | 3/1995 | Krebs et al. ................. | 297/411.2 |
| 6,238,002 | B1 * | 5/2001 | Brewer et al. ............ | 297/411.32 |
| 6,361,114 | B1 * | 3/2002 | Rumler ..................... | 297/411.39 |
| 8,328,286 | B2 * | 12/2012 | Steury et al. ............. | 297/411.39 |

* cited by examiner

*Primary Examiner* — Sarah B McPartlin
(74) *Attorney, Agent, or Firm* — Ladas & Parry LLP

(57) ABSTRACT

An auto-adjustable armrest mechanism for reclining seats is disclosed. The armrest mechanism causes the armrests to follow a more natural movement of an occupant's arms when adjusting the seatback to different angles. The armrest mechanism utilizes a cam that rotates in response to movement of the seatback relative to the seat base. A rod connected to the rotatable armrest is in communication with and, in turn, responsive to the rotation of the cam for defining an auto-adjustable angle between the seatback and the armrest.

18 Claims, 6 Drawing Sheets

SELF-ADJUSTABLE ARM REST ASSEMBLY

CROSS-REFERENCE TO RELATED PATENT APPLICATIONS

None

BACKGROUND OF THE INVENTION

1. Field of the Invention

The present invention relates to a seating system. More particularly, the present invention relates to an auto-adjustable arm rest mechanism for reclining seats.

2. Description of the Related Art

Arm rests for vehicle seats such as commonly used in recreational vehicles are typically pivotally connected to the seat frame and are shiftable between a generally horizontal position and generally vertical position. This pivotal connection of the arm rest to the seat frame permits the arm to be raised for passenger entrance or exit. A drawback of prior art arm rests is that as the position of the back rest reclines, the arm rests remain in a strictly perpendicular orientation with respect to the back rest which may result in discomfort to the user.

SUMMARY OF THE INVENTION

The present invention is directed at a tailored arm assembly adaptable to a seat, such as a bucket seat, that allows for self-leveling of the arm throughout movement of the seatback as it is reclined or released. The arm is also freely rotatable to a stowed position to allow easy ingress/egress of a user. The tailored arm assembly is fitable to various seat frame designs without adding separate seat frame SKUs. In an embodiment, the tailored arm assembly may be fitted to a wide range of existing seat pans, back frames, and hinges. It may be added as an optional feature to a product line during the frame assembly process or added to an existing product in the field.

According to one aspect of the present invention, there is provided an apparatus for attachment to a reclining seat having a seatback and a seat pan for changing an angle of an arm rest with respect to the seatback when the seatback pivots with respect to the seat pan. The apparatus may include a lever pivotally connected to a peg support member and a rod having a first end attached to the arm rest and a second end opposite the first end. The apparatus may further include a peg extending inward from an inner surface of a peg support member and through an elongated slot formed in a bracket. The apparatus may include a cam having an aperture for receiving the second end of the rod. The lever, the bracket, the cam, and the arm may each have respective apertures axially aligned. A fastener may extend through each respective aperture. The peg may engage a contact surface of the cam for changing the angle of the arm rest with respect to the seatback in response to pivotal movement of the seatback.

According to another aspect of the invention, a reclining seat has a lever pivotally connected to a seat pan at a first end and to a peg support member at a second end. A bracket may be connected to the seatback and a rod having a first end may be attached to an arm rest. A peg may extend inward from an inner surface of the peg support member and through an elongated slot formed in the bracket. A cam may have an aperture for receiving the second end of the rod. In operation, the peg may engage a contact surface of the cam for changing the angle of the arm rest with respect to the seatback in response to pivotal movement of the seatback.

According to another embodiment, a reclining seat comprises a lever assembly connected to a seat pan and a seatback. A peg may be supported by the lever assembly. An arm rest is pivotally connected to the seatback and in contact with the peg, wherein the arm rest is responsive to movement of a peg support to adjust the angle of the arm rest with respect to the seatback. The lever assembly may have the peg support member pivotally connected to a lever connected to the seat pan. The peg may be supported by the peg support member. The reclining seat may also include an anchor bracket attached to the seat pan, wherein an initial angle of the arm rest is adjustable through selective alignment of the lever with an elongated aperture in the anchor bracket. The arm rest may have a cam in contact with the peg.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
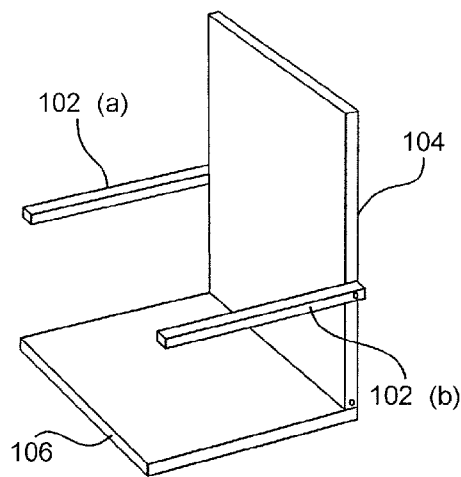
FIGS. 1A-1C illustrate an example of movement of the arm rests of a reclining chair, in accord with an embodiment of the present invention.

The present invention will now be described more fully with reference to the accompanying drawings, in which exemplary embodiments of the invention are shown. In the drawings, elements denoted by the same reference numerals are substantially the same elements.

The disclosed apparatus, referred to herein sometimes as a self-leveler attachment mechanism (self-level attachment), is attachable to a reclining seat for increasing the comfort of a user. Conventional reclining seats, such as driver and passenger seats for recreational vehicles, have a seat base, a seatback, and arm rests. The seatback is recline-able to varying degrees with respect to the seat base. The arm rests are secured to the reclining seat such that the arm rests either remain in a fixed position (e.g., horizontal) regardless of the angle of the seatback, or are attached to the seatback in a fixed position, such as a perpendicular to the seatback regardless of the angle of the seatback. The apparatus disclosed herein provides an improvement to conventional seats by automatically varying the angle of the arm rest with respect to the seatback in response to adjustments of the angle of the seatback with respect to the seat base. Further, the angle of the arm rest adjusts automatically (without help from a user) as the seatback is reclined/inclined.

Figure 1B:
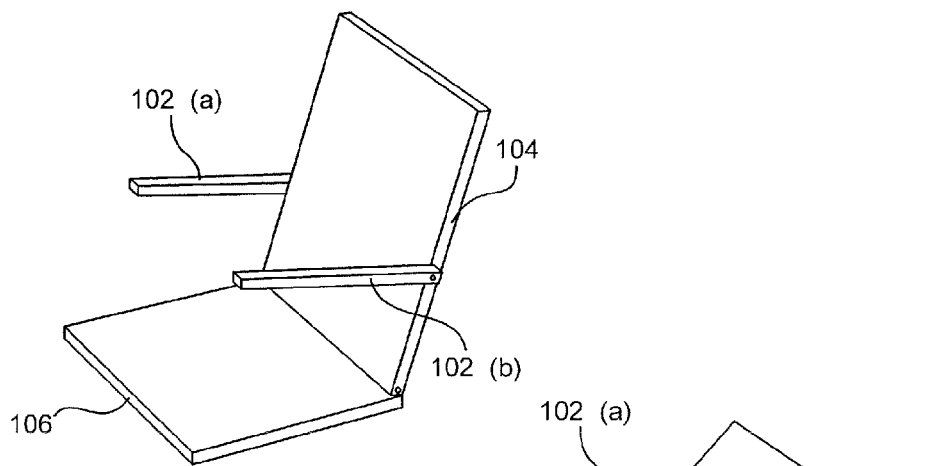
Figure 1C:
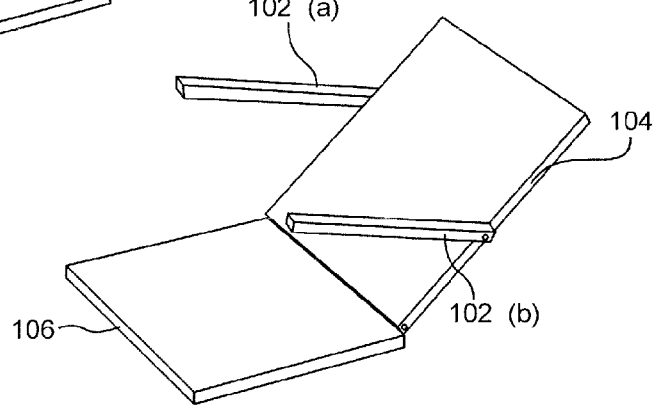

FIGS. 1A-1C illustrate an example of movement of arm rests 102(*a*), 102(*b*) as a seatback 104 reclines, in accord with an embodiment of the present invention. FIG. 1A illustrates the seatback 104 in an upright or perpendicular position with respect to the seat base 106. In this position the self-level attachment (not shown) positions and maintains the arm rests 102(a), 102(b) at an approximate 90 degree angle with respect to the seatback 104, and approximately horizontal. FIG. 1B illustrates the seatback 104 in a first reclined position, slightly greater than 90 degrees. In this position the self-level attachment positions and maintains the arm rests 102(a), 102(b) at an angle that is less than perpendicular to the seatback 104, and non-horizontal. FIG. 1C illustrates the seatback 104 in a second reclined position, moderately greater than 90 degrees. In this position the self-level attachment positions and maintains the arm rests 102(a), 102(b) at an angle that is moderately less than perpendicular to the seatback, and further off the horizontal plane.

FIGS. 1A-1C illustrate arm rest positions that provide increased comfort to a user as compared to conventional reclining seats. It is noted that FIGS. 1A-1C illustrate three positions of a reclining seat. However, it will be appreciated that the present invention is not so limited. Rather, in accord with a disclosed embodiment the position of the arm rests 102(a), 102(b) may automatically set to any one or more of several or many angles in relation to the angle of recline.

Figure 2A:
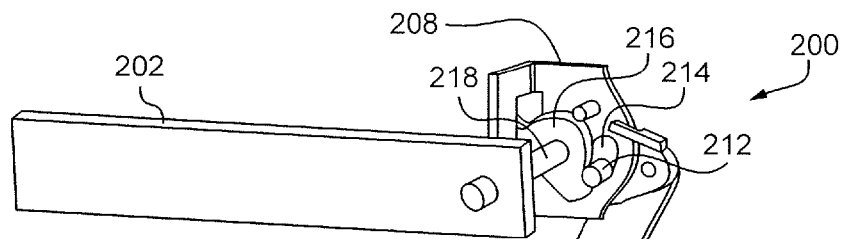
FIGS. 2A-2C illustrate an example of movement of an embodiment of a self-level attachment, corresponding to the movement of the arm rests illustrated in FIGS. 1A-1C.
Figure 2B:
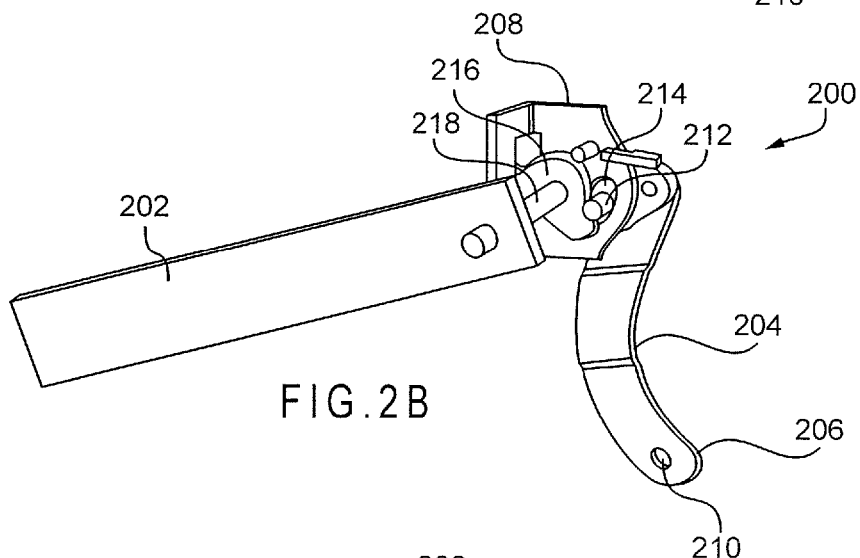
Figure 2C:
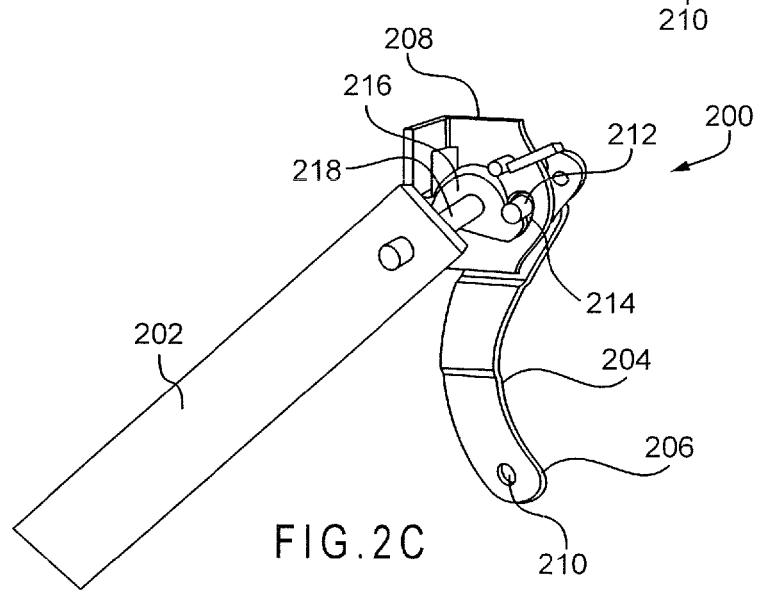

FIGS. 2A-2C illustrate an embodiment of the self-level attachment 200 of the present invention. It is noted that the self-level attachment is not shown in FIGS. 1A-1C, which merely illustrate arm rest functionality provided by the self-level attachment 200. As discussed below in relation to FIG. 4, the self-level attachment 200 may be secured to the reclining seat by any securing means, such as screws, bolts, welds, pins, or any other type of securing means known in the art, etc. In an embodiment, the self-level attachment 200 may or may not include an arm 202. In other words, in one version, the self-level attachment 200 may include an arm 202 to replace an original arm rest 102(a), 102(b) supplied with a reclining seat. In another version, the self level attachment 200 may be retrofitted to an existing arm rest. It will be appreciated that the self-level attachment 200 may be assembled as an original component in the assembly of a reclining seat, or may be retrofitted to an assembled reclining seat by a manufacturer or aftermarket installer and upholsterer.

Figure 3:
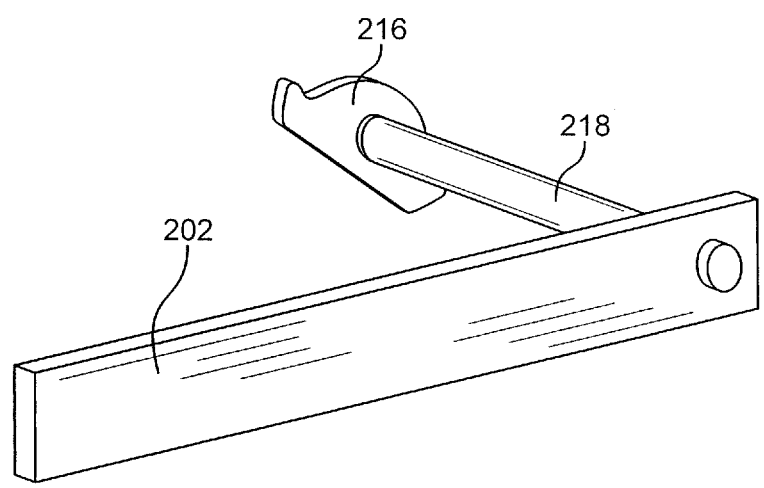
FIG. 3 illustrates an embodiment of a cam and arm rest of a self-level attachment.

FIGS. 2A-2C illustrate the self-level attachment 200 in three positions, corresponding respectively (in the present example) to the three positions of the seatback 104 illustrated in FIGS. 1A-1C. In an embodiment, the self-level attachment 200 includes a lever 204 that is attachable to a seat base at one end 206, and a bracket 208 that is attachable to a seatback. The lever 204 is pivotable with respect to the seatback about an axial contact point 210. The bracket 208 has a slot 214 through which a peg 212 protrudes. As the seatback reclines, the bracket 208 moves rearward causing the peg 212 to shift upwards within the slot 214. As the peg 212 shifts upwards, the angle of the arm 202 with respect to the bracket 208 shifts downward, providing the relative movement illustrated in FIGS. 1A-1C. The arm angle corresponds to the rotational movement of a cam 216. The cam 216 is connected to the arm 202 by way of a rod 218, as illustrated in FIG. 3.

Figure 4:
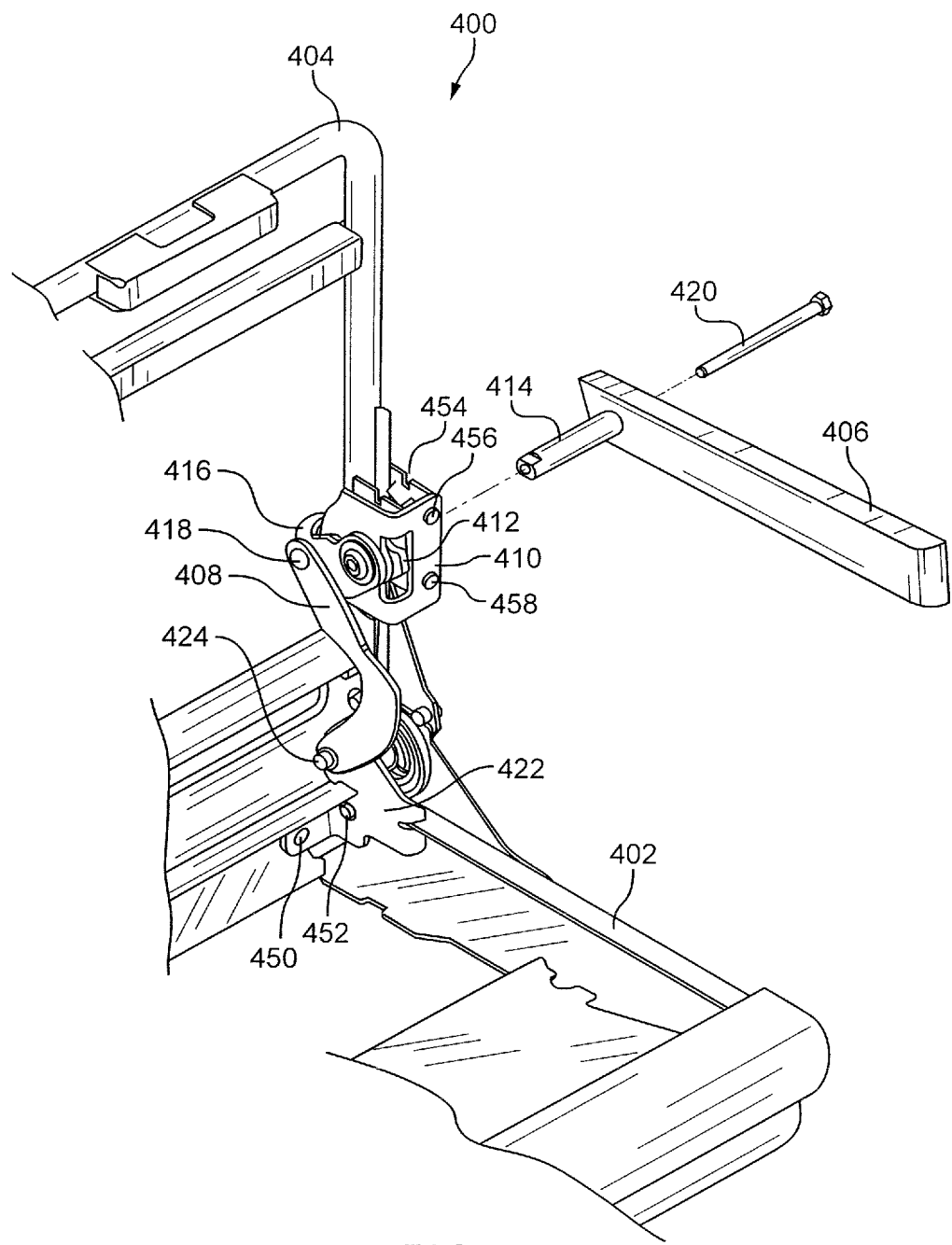
FIG. 4 illustrates an embodiment of a self-level attachment secured to a reclining seat in accord with a disclosed embodiment.

FIG. 4 illustrates an embodiment of a self-level attachment 400 secured to a reclining seat. As illustrated, a lower bracket 422 (sometimes referred to as an anchor bracket) is provided and secured to the seat base 402 by securing means 450, such as a screw, bolt, weld, pin, or any other type of securing means known in the art, etc. The lower bracket may be provided as a stock part or may be customized to the configuration of the reclining seat according to manufacturer, make, and/or model. The lower bracket may include an access hole 452 for accessing recliner components obstructed by the lower bracket 422. At the opposite end of the self-level attachment 400, the bracket 410 may be secured to the seatback 404 by way of an attachment 454. The attachment 454 is preferably welded to the seatback 404 and includes bolt holes for receiving a pair of bolts 456, 458 (or other securing means known in the art) for securing the bracket 410 thereto. The assembly is completed by securing the arm 406 to the cam 412 with a bolt 420 that passes through the rod 414. As illustrated, the lever 408 is connected to both the lower bracket 422 and a peg support 416 (shown more clearly in FIG. 5) by axial attachment members 418, 424 to provide relative rotational movement of the self-level attachment 400 when the seatback reclines.

Figure 5:
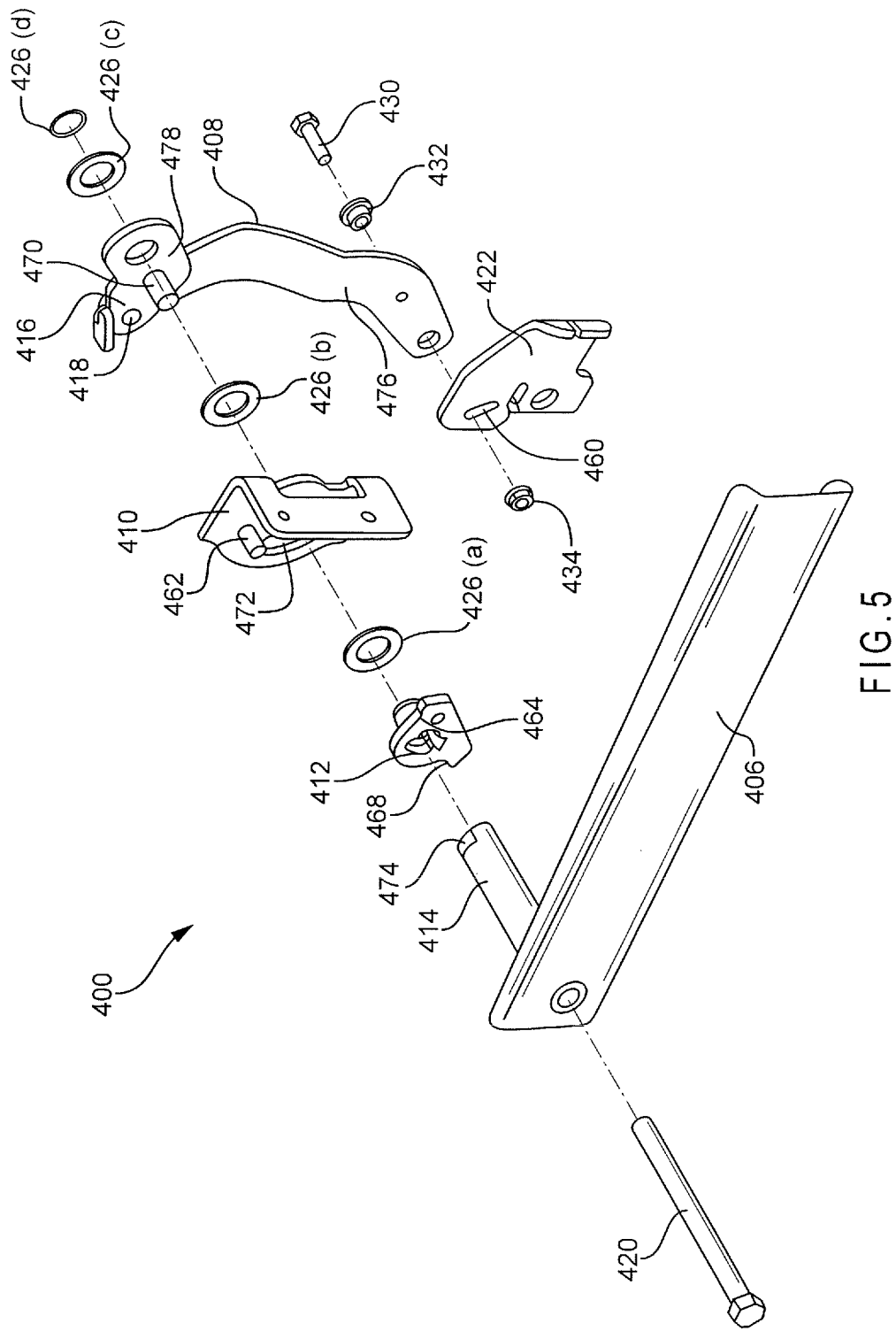
FIG. 5 illustrates an embodiment of components of a self-level attachment of the present invention in an unassembled state.
Figure 6:
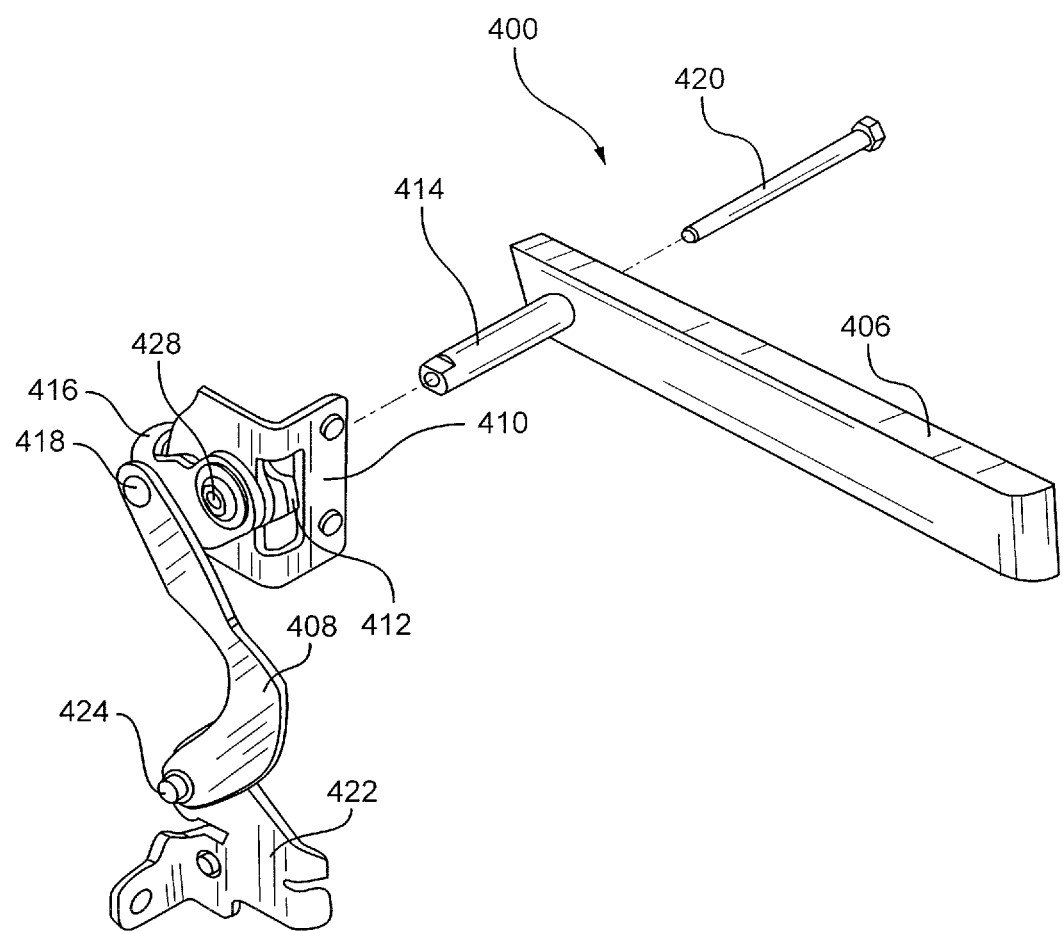
FIG. 6 illustrates an embodiment of a self-level attachment in an assembled state.

FIGS. 5 and 6 illustrate embodiments of components of a self-level attachment 400 in unassembled and assembled states, respectively. The disclosed components are provided as the presently preferred embodiments and the scope of the invention is not limited to the component configurations shown. Also, the invention is not limited to the number of components shown. A self-leveler attachment of the present invention may comprise more or less of the disclosed components in either their disclosed configuration or alternate configurations. The self level attachment of the present invention is defined by the claims of the present application.

Referring to FIGS. 5 and 6, the self-level attachment 400 may comprise a lower bracket 422 configured (customized or universal) for attachment to a reclining seat. The lower bracket 422 includes an elongated aperture 460 to which the lever 408 is secured by a bolt 430, washer 432, and nut 434 to (referred to as axial attachment member 424 in FIG. 4). The elongated aperture 460 allows for adjustment of the initial angle of the arm 406. If secured at or nearer the upper end of the elongated aperture 460, the initial angle of the arm 406 will rest the user's hand at a lower relative position. If secured at or nearer the lower end of the elongated aperture 460, the initial angle of the arm 406 will rest the user's hand at a relatively higher position.

The lever 408, having an inner facing surface 476, is secured to the peg support 416 by an axial member 418 that allows relative rotational movement between the lever 408 and the peg support 416. As illustrated, the peg support 416 has an inner facing surface 478 and a peg 470 extending inward. As explained above, the position of the peg 470 within a slot 472 controls the angle of the arm 406 by engaging a first contact surface 468 of the cam 412. The cam 412 may be generally parabolically disk shaped and include a first contact surface 468 that may be a groove, catch, or a ledge formed on an outer surface thereof, as examples. The arm 406 is in a fixed rotational position with respect to the orientation of the cam 412 by way of engagement with a flattened surface 474 of the rod 414.

A bolt 420 axially aligns and connects the peg support 416, the bracket 410, the cam 412, and the arm 406. While the arm 406 is in a fixed position in relation to the cam 412, washers 426(a), 426(b), and 426(c) permit rotational axial displacement along the axis defined by the bolt 420. A retaining ring 426(d) engages a groove in cam 412 to secure the components positioned along the center line illustrated in FIG. 5. Bolt 420 is secured to internally threaded cam 412 (illustrated as 428 in FIG. 6). A second peg 462 (sometimes referred to as a stop peg) may be secured to the bracket 410 to limit the upward range of the arm 406 by engaging a second contact surface 464, opposite first contact surface 468 of cam 412.

The self-level seat attachment disclosed herein may be assembled to a variety of seats, such as a bucket seat. The attachment allows for self-leveling of the chair arm when in the down or user position and as the seatback is reclined or vice versa. The arm may be rotated up to a stowed position to permit proper ingress/egress of a user into/from the seating position. The attachment may be fitted to an existing seat base (also referred to as a "seat pan"), back frame, hinge, and recliner mechanism and may be added to the seat as an optional feature during the frame assembly process. The attachment may also be added to an existing product in the field without requiring significant changes to the existing poly foam components.

In the foregoing description, all or some of the components are preferably machined or otherwise formed of metal, plastic, a polymer, or other material, metal or otherwise.

It is intended that the foregoing detailed description be understood as an illustration of selected forms that the invention can take and not as a definition of the invention. It is only the following claims, including all equivalents, that are intended to define the scope of this invention.

The invention claimed is:

1. An apparatus for attachment to a reclining seat having a seatback and a seat pan for changing an angle of an arm rest with respect to the seatback when the seatback pivots with respect to the seat pan, the apparatus comprising:
    a lever pivotally connected to a peg support member;
    a bracket;
    a rod having a first end attached to the arm rest and a second end opposite the first end;
    a peg extending inward from an inner surface of the peg support member and through an elongated slot formed in the bracket; and
    a cam having an aperture for receiving the second end of the rod, said cam having a first contact surface, wherein the lever, the bracket, the cam, and the arm each have respective apertures axially aligned and having a fastener extending through each respective aperture, and wherein the peg engages the first contact surface for changing the angle of the arm rest with respect to the seatback in response to pivotal movement of the seatback.

2. The apparatus of claim 1 further comprising an anchor bracket attached to the seat pan, said lever having an aperture and said anchor bracket having an elongated aperture, wherein the lever aperture and the elongated anchor bracket aperture receive a bolt, and wherein an initial angle of the arm rest is adjustable through selective alignment of the lever aperture to a selective segment of the elongated aperture.

3. The apparatus of claim 1 further comprising a stop peg extending from a surface of the bracket, wherein the stop peg engages a second contact surface of the cam to limit movement of the arm rest.

4. The apparatus of claim 1 wherein the arm rest and the cam are in a fixed, non-rotatable alignment with respect to one another.

5. The apparatus of claim 1 wherein the elongated slot formed in the bracket defines a range of motion of the peg.

6. The apparatus of claim 3 wherein the cam is parabolically shaped and the first and second contact surfaces of the cam are on opposite sides of the parabolically shaped cam.

7. The apparatus of claim 6 wherein cam and peg are aligned such that downward movement of the first contact surface of the cam causes the arm to angle upward.

8. A reclining seat comprising:
    a seat pan;
    a lever pivotally connected to the seat pan at a first end and to a peg support member at a second end, opposite the first end;
    a seatback pivotally connected to the seat pan;
    a bracket connected to the seatback;
    a rod having a first end attached to an arm rest and a second end opposite the first end;
    a peg extending inward from an inner surface of the peg support member and through an elongated slot formed in the bracket; and
    a cam having an aperture for receiving the second end of the rod, said cam having a first contact surface, wherein the peg engages the first contact surface for changing the angle of the arm rest with respect to the seatback in response to pivotal movement of the seatback.

9. The reclining seat of claim 8 further comprising a fastener, and wherein the lever, the bracket, the cam, and the arm each have respective apertures axially aligned and the fastener extends through each aperture.

10. The apparatus of claim 8 further comprising an anchor bracket attached to the seat pan, wherein an initial angle of the arm rest is adjustable through selective alignment of the first end of the lever with an elongated aperture in the bracket.

11. The apparatus of claim 8 further comprising a stop peg extending from a surface of the bracket, wherein movement of the arm rest is limited by the stop peg.

12. The apparatus of claim 8 wherein an elongated slot formed in the bracket defines a range of motion of the peg.

13. A reclining seat comprising:
    a seat pan;
    a seatback pivotally connected to the seat pan;
    a lever pivotally connected to the seat pan at a first end and to a peg support member at a second end, opposite the first end;
    a rod having a first end attached to an arm rest and a second end opposite the first end;
    a peg extending inward from an inner surface of the peg support member;
    a parabolically shaped cam having first and second contact surfaces, wherein the peg engages the first contact surface for changing the angle of the arm rest with respect to the seatback in response to pivotal movement of the seatback, and a stop peg engages a second contact surface of the cam for limiting movement of the arm rest.

14. The reclining seat of claim 13 wherein the lever, the parabolically shaped cam, and the arm each have respective apertures axially aligned and having a fastener extending through the apertures.

15. The reclining seat of claim 13 further comprising a bracket connected to the seatback, wherein an elongated slot formed in the bracket defines a range of motion of the peg.

16. The apparatus of claim 13 wherein the cam and parabolically shaped peg are aligned such that downward movement of the first contact surface of the cam causes the arm rest to angle upward.

17. A reclining seat comprising:
    a seat pan;
    a seatback pivotally connected to the seat pan;
    a lever assembly connected to the seat pan and the seatback;
    a peg supported by said lever assembly;
    an arm rest pivotally connected to the seatback and in contact with the peg, wherein the arm rest is responsive to the movement of the peg to adjust the angle of the arm rest with respect to the seatback,
    wherein the lever assembly comprises a peg support member pivotally connected to a lever, the lever is connected to the seat pan, and the peg is supported by the peg support member; and an anchor bracket attached to the seat pan, wherein an initial angle of the arm rest is adjustable through selective alignment of the lever with an elongated aperture in the anchor bracket.

18. The reclining seat of claim 17, wherein the arm rest comprises a cam in contact with the peg.

* * * * *